(12) United States Patent
Liu (10) Patent No.: US 9,126,611 B2
(45) Date of Patent: Sep. 8, 2015

(54) HANDCART

(76) Inventor: Chi Keung Liu, Yuen Long (CN)

(*) Notice: Subject to any disclaimer, the term of this patent is extended or adjusted under 35 U.S.C. 154(b) by 174 days.

(21) Appl. No.: 13/486,368

(22) Filed: Jun. 1, 2012

(65) Prior Publication Data

US 2013/0056962 A1    Mar. 7, 2013

(30) Foreign Application Priority Data

Jun. 20, 2011    (HK) .................................. 11106270.5

(51) Int. Cl.
| | | |
|---|---|---|
| *B62B 3/02* | (2006.01) | |
| *B62B 5/06* | (2006.01) | |
| *B62B 3/08* | (2006.01) | |

(52) U.S. Cl.
CPC ................ *B62B 3/022* (2013.01); *B62B 5/067* (2013.01); *B62B 3/08* (2013.01); *B62B 2205/20* (2013.01)

(58) Field of Classification Search
CPC ............ B62B 2202/10; B62B 2202/12; B62B 2205/00; B62B 2205/30; B62B 2206/006; B62B 1/12; B62B 3/02; B62B 1/20; B62B 2203/07; B62B 5/067
USPC ........ 280/47.17, 47.18, 46.26, 47.315, 47.34, 280/47.371, 79.11, 79.2, 638, 35, 639, 651, 280/655, 659, 47.131, 47.12, 47.2, 47.15, 280/47.16; 414/628, 634, 643, 639, 641, 414/642, 640
See application file for complete search history.

(56) References Cited

U.S. PATENT DOCUMENTS

| | | | | |
|---|---|---|---|---|
| 1,329,995 A * | 2/1920 | Oubridge | .................... | 254/10 C |
| 2,030,925 A * | 2/1936 | Lea | ................. | 254/3 R |
| 2,313,591 A * | 3/1943 | Slaughter | .......................... | 298/2 |
| 2,398,584 A * | 4/1946 | Goodrich | ..................... | 254/3 R |
| 2,598,168 A * | 5/1952 | Hooz et al. | .................... | 280/641 |
| 3,655,212 A * | 4/1972 | Krass et al. | ................... | 280/641 |
| 3,951,287 A * | 4/1976 | Cofer | ............................ | 414/427 |
| 4,009,891 A * | 3/1977 | Jensen | ......................... | 280/651 |
| 4,561,674 A * | 12/1985 | Alessio | ........................ | 280/655 |
| 4,632,627 A * | 12/1986 | Swallows | ..................... | 414/490 |
| 4,921,270 A * | 5/1990 | Schoberg | ................... | 280/655.1 |
| 5,277,439 A * | 1/1994 | Pipes et al. | .................... | 280/47.2 |
| 5,779,251 A * | 7/1998 | Meier | ........................... | 280/47.2 |
| 5,899,297 A * | 5/1999 | Clark | ............................ | 182/230 |
| 6,170,855 B1 * | 1/2001 | Bianchetto | .................. | 280/651 |
| 6,273,438 B1 * | 8/2001 | Prapavat | ................... | 280/47.21 |
| 6,364,328 B1 * | 4/2002 | Stahler, Sr. | ................ | 280/47.18 |
| 6,478,529 B1 * | 11/2002 | Willey et al. | .................. | 414/678 |
| 6,578,857 B1 * | 6/2003 | Whiteside et al. | ............ | 280/32.6 |
| 7,624,998 B2 * | 12/2009 | Barlow et al. | ............ | 280/47.371 |
| 8,297,641 B2 * | 10/2012 | Landry et al. | ................ | 280/647 |
| 8,465,046 B2 * | 6/2013 | Meyers et al. | ................ | 280/651 |
| 2008/0014066 A1 * | 1/2008 | Kolesa et al. | ................. | 414/469 |
| 2011/0215624 A1 * | 9/2011 | Laslo et al. | .................... | 297/329 |
| 2012/0007335 A1 * | 1/2012 | Perry | ........................... | 280/402 |

* cited by examiner

*Primary Examiner* — J. Allen Shriver, II
*Assistant Examiner* — Emma K Frick
(74) *Attorney, Agent, or Firm* — Gloria Tsui-Yip; Miskin & Tsui-Yip LLP (57) ABSTRACT

The present invention involves a casual handcart, it is comprising two parts, an upper part has a support board and a handle, the handle can be divided into an upper portion and a lower portion, a lower part is a bottom frame, there are at least three wheels at the bottom frame, a pivot and a support frame makes an organic combination between a hand-pull-cart a and a hand-push-cart b, the pivot and the support frame is the main part which achieves the unique function of the handcart, this two cooperate with each other and neither is dispensable.

11 Claims, 11 Drawing Sheets

HANDCART

FIELD OF THE INVENTION

This present invention relates broadly to a handcart. To be more specific, the invention relates to a casual handcart.

BACKGROUND OF THE INVENTION

In real life, people usually use hand carts to transport luggage or cargo, etc., it's quite convenient. A common handcart usually comprises a draw rod, a bearing-board, and vehicle wheels mounted under the bearing-boards; by pulling the draw rod with the hand, the wheels will be dragged to roll, and the bearing-board will move, thus transporting luggage or cargo. There are two types of common handcart: the first type usually comprises a base board and four wheels mounted under the base board, this makes the whole handcart able to be parked steadily, and all the weight of the luggage and cargo is taken by the base board; the draw rod is mounted at the other side of the base board, and is used to pull the base board to move, the draw rod doesn't take the weight of the luggage/cargo, when pulling the handcart, you only need to pull horizontally at the draw rod, this type is usually used to transport heavy weight goods. But, this type of handcart can not be folded easily, and it is inconvenient for storage or empty load.

The second type of handcart can be folded, and two wheels are usually mounted under the base board, the draw rod is mounted at one side of the base board, the draw rod can be folded on the base board to make it convenient to reduce the handcart's volume for storage or empty load. But when transporting heavy weight goods, the draw rod needs to be tilted to make the base board raised up, and then the base board can be pulled to move, at that time, the fulcrum formed by the wheels and the hand which is pulling the draw rod will take all the weight, so this type of handcart is only used to transport light weight goods. If the weight is too heavy, the draw rod will be bent easily, and even be broken, and it's very laborious while pulling the handcart to move.

A couple of comments about the relevant patent literature, among the relevant patent literature, CN201272376Y and CN201249791Y are similar in high degree. At a glance, this handcart is similar to the above two types of handcarts, but they are very different.

SUMMARY OF THE INVENTION

Figure 1:
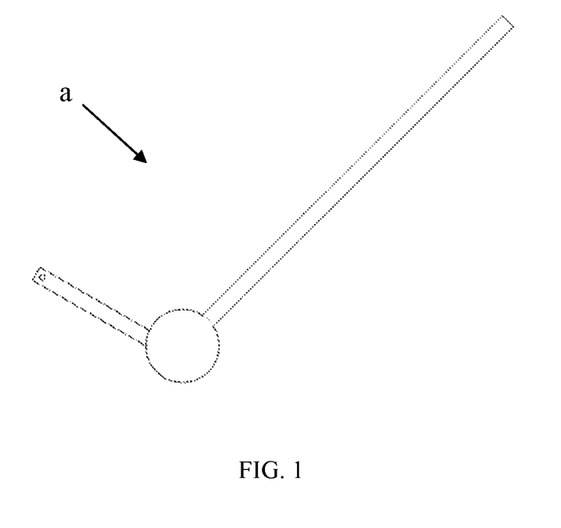
FIG. 1 shows the background technology of the present technology hand-pull-cart "a" described in this present invention.
Figure 2:
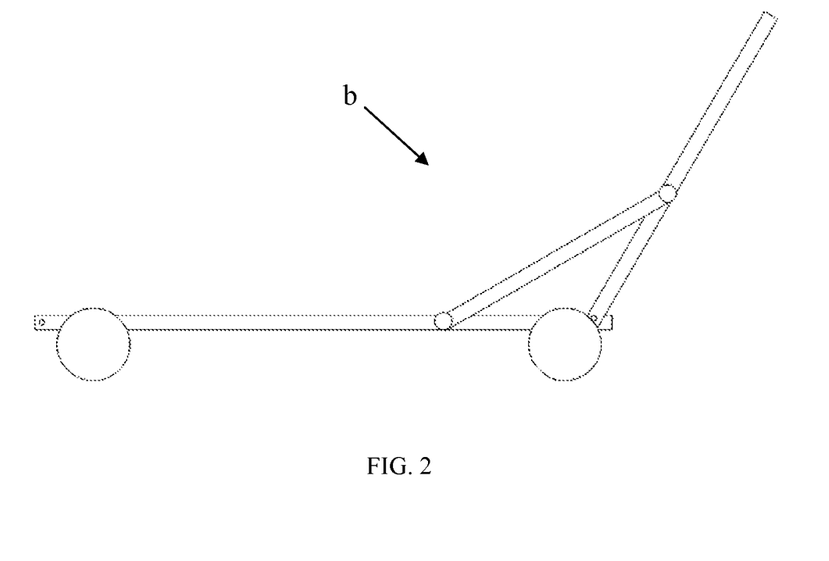
FIG. 2 shows the background technology of the present technology hand-push-cart "b" described in this present invention.
Figure 3:
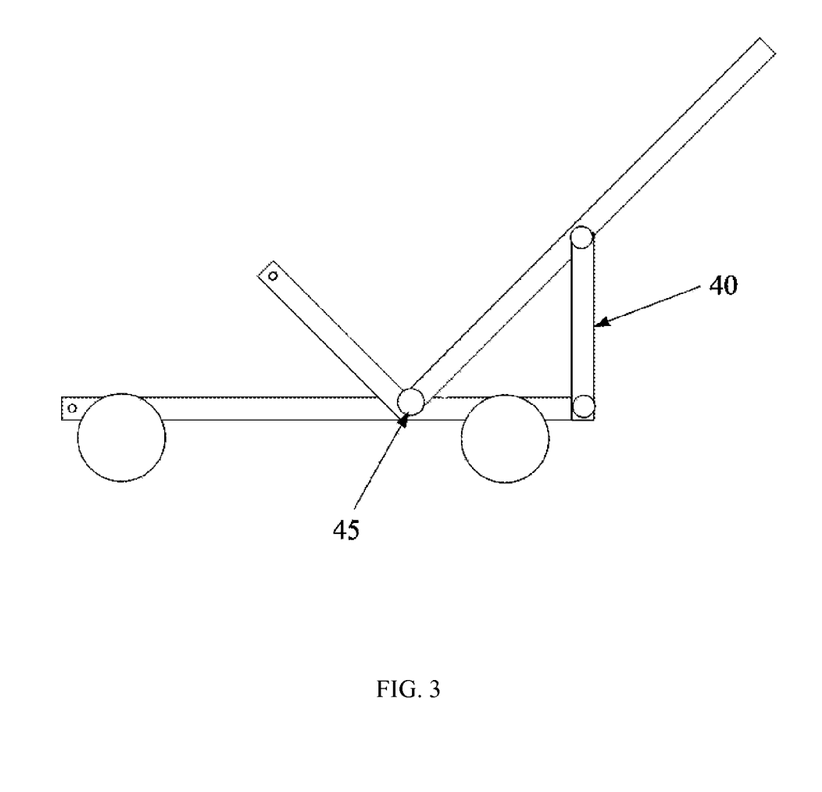
FIG. 3 shows the background technology of the casual handcart described in this present invention.

The technical problem this present invention needs to deal with is, against the problems in the handcarts by the existing techniques, to offer a casual handcart which can be folded and does not require the hands to take weight. This present invention aims at solving the shortcomings of the existing techniques, which lies in the inability to combine the common strengths of hand-pull-cart a (see FIG. 1) and hand-push-cart b (see FIG. 2), the users have to use the two types of handcart separately to realize the users' using purpose, this present invention will solve the above problems, hand-push-cart is combined with hand-pull-cart by the organic cooperation of pivot 45 and support frame 40 (see FIG. 3) to meet users' need for casual handcarts.

About the original design, this cart takes the handiness of hand-pull-cart and the labor-saving of hand-push-cart as original basis point, combines the strengths of the two handcart types, and overcomes the shortcomings that the hand-pull-cart requires the hands to support part of the goods' weight and that the hand-push-cart is not easy to pull when carrying goods, combines the two handcart types ingeniously.

About the structure, the handcart can be divided into the upper hand-pull-cart part and the lower hand-push cart part, by the cooperation of pivot and support frame, the upper part and the lower part are combined organically, and this becomes the unique characteristic of the handcart. The pivot of the handcart is fixed, one end of the support frame is fixed at the lower part of the middle of the handle, the other removable end can be connected to the delivery chute behind the bottom frame. Although types of CN2021272376Y and CN201249791Y can also be divided into two parts, the upper and lower parts are both support frames, and that is different from the upper hand-pull-cart part and the lower hand-push-cart part of the present handcart.

The pivot of the present handcart is the main unit which connects the upper part with the lower part, the upper part is mounted at the corner of the V shape bottom, the lower part is mounted at the location which is about one third behind the bottom frame, this is the main position to take the goods' weight, the support frame also takes a little part of the goods' weight (only a small part), but its function focuses on making the handle and the bottom frame form a certain angle, and that makes the handcart able to be pulled/pushed at all times to get the most labor-saving effect. The types of CN2021272376Y and CN201249791Y first use the upper support frame and then deliver to the lower support frame location by the front and back pivots and support rods almost averagely. In function, the handcart is a combination of hand-pull-cart and hand-push-cart, so it can be pushed or pulled randomly and at any time, and it is very labor-saving, this is the unique function of the handcart, which the types of CN2021272376Y and CN201249791Y cannot achieve. Besides, the manufacturing procedures of CN2021272376Y and CN201249791Y is quite complicated and the cost is quite expensive (commonly above 1000 Yuan), the cart body is heavy, and they are only appropriate to be used in places like factories, wharfs, markets, etc.

The handcart has a simple structure, and is easy to be produced; the weight of the cart body is light, the volume is small after folded, and it is convenient to carry and store; the price is relatively low, and it is adaptive to promote use among ordinary families. The above strength is what the types of CN2021272376Y and CN201249791Y cannot compete with.

Further, although JP2009-184775A is a little similar to the present handcart, it is a type of delivering cart; its design idea is taking delivering as the purpose, the handcart takes the hand-pull-cart and hand-push-cart as the design idea, so it is a combination of hand-pull-cart and hand-push-cart; in structure, the handcart uses the pivot to combine the upper part with the lower part, and the position is fixed, with the cooperation of the support frame, an angle which is suitable for pulling and pushing is formed between the handle and the bottom frame. The pivot of JP2009-184775A is movable to adjust the angle of the cart. The point which needs to be specifically emphasized is, the shape of the present handcart is the result of the combination of hand-pull-cart and hand-push-cart, the angle formed is for convenience for pulling and pushing, this is the essential difference between the present handcart and JP2009-184775A.

Seen from the above aspects, the essential difference between the present invention and other cart types like CN202172376Y, CN201249791Y, CN2021272376Y, etc. is obvious, as to other types like: CN2159913Y, U.S. Pat. No. 6,168,174B1 and JP2008-1228A, etc., the difference is even greater, and they will not be explained here.

The hand-pull-cart being the upper part, with the hand-push-part being the lower part is a prior art. But all the present inventions are newly made after improving the previous work. As a handcart, the handle, bottom frame, wheels are no doubt necessary, and these are fundamental elements for a handcart. People first use the brain's thinking ability to embody their value, a machine has its effects by the valid cooperation of all its machine parts, and this handcart embodied its unique effects by the organic combination of the pivot and the support frame. It seems simple and ordinary, but an unordinary thing is made from the most simple and ordinary things, this is where the value of the present invention lies.

This present invention has theses characteristics: simple design, easy to be produced, convenient to carry, relatively small volume, convenient for storage, low cost of production, and its suitable to promote use by ordinary families. The most important is that it can be pulled and pushes at all times, and it is labor-saving and convenient, the above is the life force of this present invention.

The establishment of the patent is for encouraging more inventions from people, but the ultimate purpose is to benefit the public, the present inventor has been using handcarts form the late 1980s till now, and he realizes deeply, he is best qualified to speak on which type of and whether a handcart is convenient to use, and this is the original motivation of this present invention. Until present, wide varieties of hand-pull-carts can be seen in the market, but a type which has the function of this present invention has not appeared yet. The most important value of this present invention lies in its practicability. The present inventor believes that in a short time after this present invention is offered to the marketplace, this present invention will be promoted to use in the world. And this is the value of this present invention.

The technical scheme which this present invention uses to solve its technical problems is: to form a casual handcart, it is made up of two parts, the upper part comprises the support board and the handle, the handle can be divided into an upper portion and a lower portion, the lower part is the bottom frame, there are at least three wheels at the bottom frame, the pivot and the support frame makes an organic combination between the hand-pull-cart and the hand-push-cart, the pivot and the support frame is the main part which achieves the unique function of the handcart, this two cooperate with each other and neither is dispensable.

For the casual handcart of the present invention, the pivot is mounted at the V shape bottom of the upper part and the position which is slightly after the middle of the bottom frame towards the rear.

About the casual handcart described in the present invention above, the first end of the support device is rotatably connected to the draw rod described, and the second end's position is mounted at the rearmost of the bottom frame described.

For the casual handcart of the present invention, the said frame comprises a horizontal positioning device, the second end of the support device is adapted to be fixed inside the horizontal positioning device in order to prevent the sliding motion of the second end of the support device.

For the casual handcart of the present invention, the said horizontal positioning device comprises an aperture which is positioned at the bottom of the horizontal positioning device, the aperture comprises a pin adapted for allowing the second end of the support device to be fixed inside the horizontal positioning device.

About the casual handcart described in the present invention above, the pivot combines the upper part with the lower part, and the handle is fixed to form a certain angle by the support frame.

About the casual handcart described in the present invention above, the goods' weight is mainly supported by the pivot, and then is delivered to the bottom frame; the support frame only supports a small part of the goods' weight.

About the casual handcart described in the present invention above, the support frame mainly makes the handle form a certain angle with the bottom frame, which achieves the most energy-saving effect while pulling or pushing the handcart.

About the casual handcart described in the present invention above, the rotary frame has an extending board.

About the casual handcart described in the present invention above, braking system is mounted under the extending board.

About the casual handcart described in the present invention above, the draw rod comprises the rotatably connected upper draw rod and lower draw rod, a locking mechanism is mounted at the connection point of the upper draw rod and the lower draw rod.

About the casual handcart described in the present invention above, the locking mechanism described comprises the lock plate and lock slot which is mounted between the upper draw rod and lower draw rod described above.

The implementation of the handcart of this present invention has the following effects: the weight of the whole handcart can be reduced by setting the bottom frame as the load bearing board; the draw rod can be folded on the bottom frame by setting the draw rod on the bottom frame; the handcart can park at all times without the hand's holding by setting at least three wheels at the bottom of the bottom frame; by setting a support device between the draw rod and the bottom frame, the weight of the goods which lean against the draw rod is delivered to the bottom frame, and there is no need to apply a component force to defy gravity, thus it is more convenient and labor-saving.

BRIEF DESCRIPTION OF THE DRAWINGS

Next a further instruction on this present invention will be given by combining with the appended figures, in the figures:

FIG. 4b is a perspective partial view of part A in FIG. 4a;

SPECIFIC IMPLEMENTATION MANNER

As FIGS. 3, 4, 5, 6, 7, 8, 9, 10, 11 show, the preferred embodiment of the casual handcart described in this present invention comprises, bottom frame 10, cart wheel 20, draw rod or handle 30, support device 40 and rotary frame or support board 50. Wheels 20 are mounted evenly at the bottom of bottom frame 10 separately, which makes bottom frame 10 able to be supported by wheel 20 and the handcart able to be parked on a flat surface; at least three wheels 20 are mounted, there are four in this preferred embodiment. Draw rod or handle 30 is rotatably mounted at the bottom frame 10, so the tilt angle between handle 30 and bottom frame 10 can be changed when bottom frame 10 is pulled by handle 30. It is better to mount the connection of draw rod or handle 30 at the bottom frame's 10 end which is near the moving direction, so the pull effective point can be advanced and the pull force will be smaller; and when handle 30 is folded, the overlaps of bottom frame 10 and handle 30 becomes more, this will reduce the storage space of draw rod or handle 30 as much as possible.

Support device 40 is mounted between draw rod or handle 30 and bottom frame 10, when the casual handcart is carrying too much weight, draw rod or handle 30 will take some of the weight, support device 40 distributes the weight which draw rod or handle 30 takes to bottom frame 10, and then the end of draw rod or handle 30 need not be applied a component force to defy gravity. The first rotary connection end of support device 40 can be mounted at draw rod or handle 30, and the second end mounted at bottom frame 10; then when the handcart is carrying weight, support device 40 can deliver part of the weight borne by draw rod or handle 30, and when the handcart is stored, support device 40 can be rotated to the plane where handle 30 locates and then be rotated to the plane where bottom frame locates with handle 30, then the handcart can be folded and stored. To be specific, support device 40 can be mounted as a side open half-frame shape, and the side opposite to the open side is the second end 42 of the support device 40, the end of the side rod which is near the open side is rotatably connected with draw rod or handle 30 (like pin connection), and this is the first end 41. The horizontal positioning device 11 is mounted on bottom frame 10, when the casual handcart is carrying weight, the support device 40 can be rotated, then the second end of support device 40 is snapped into a horizontal positioning device 11 to prevent the second end of the support device 40 from sliding. According to the needs, more than one horizontal positioning device 11 can be mounted on the bottom frame 10 so as to adjust the angle between handle 30 and bottom frame 10 according to needs, and adjust the inclination direction of draw rod or handle 30 to give the manual draw rod or handle 30 an optimum inclination direction.

Figure 4:
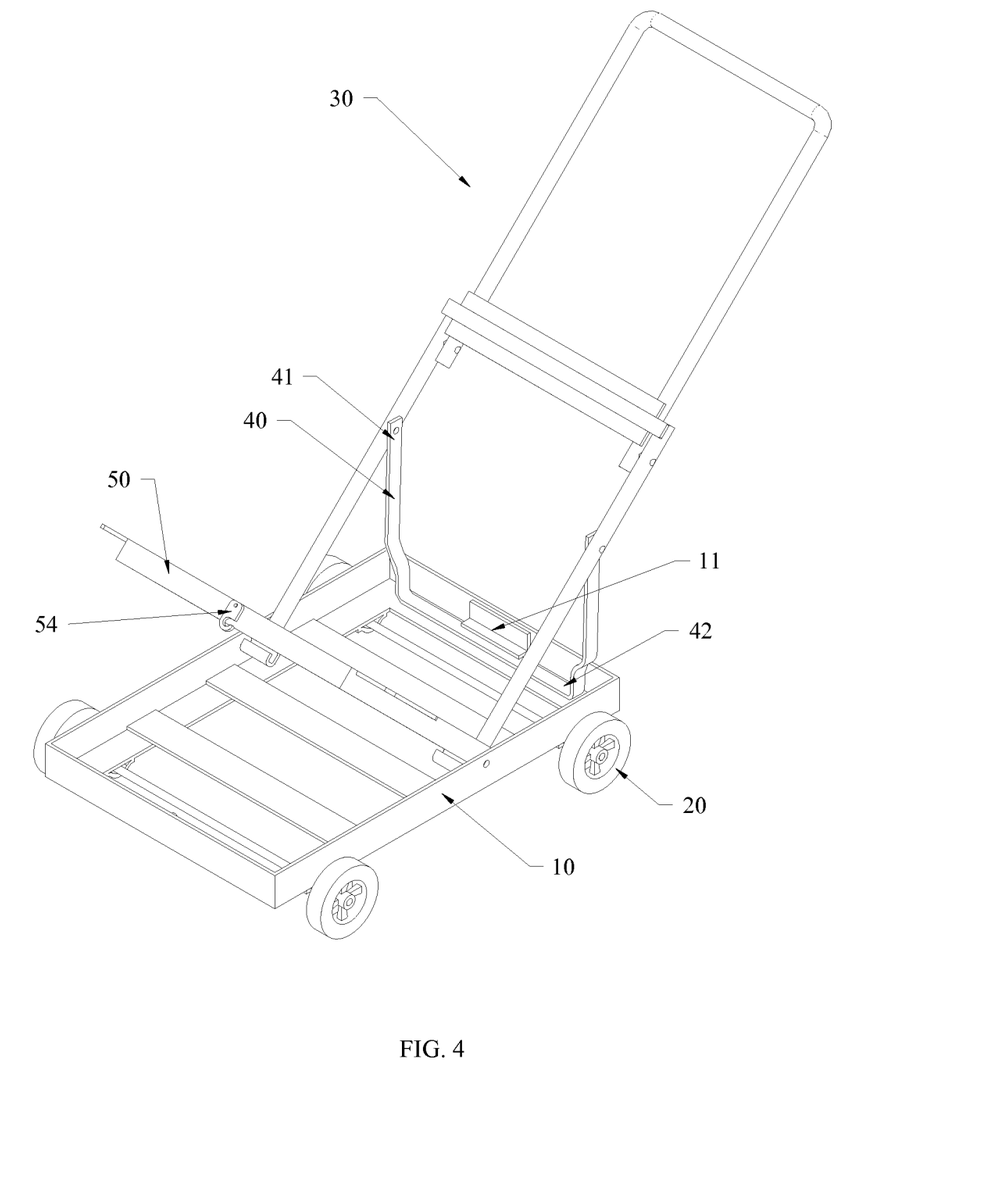
FIG. 4 is a perspective view of the working preferred embodiment of the casual handcart described in this present invention.
Figure 4A:
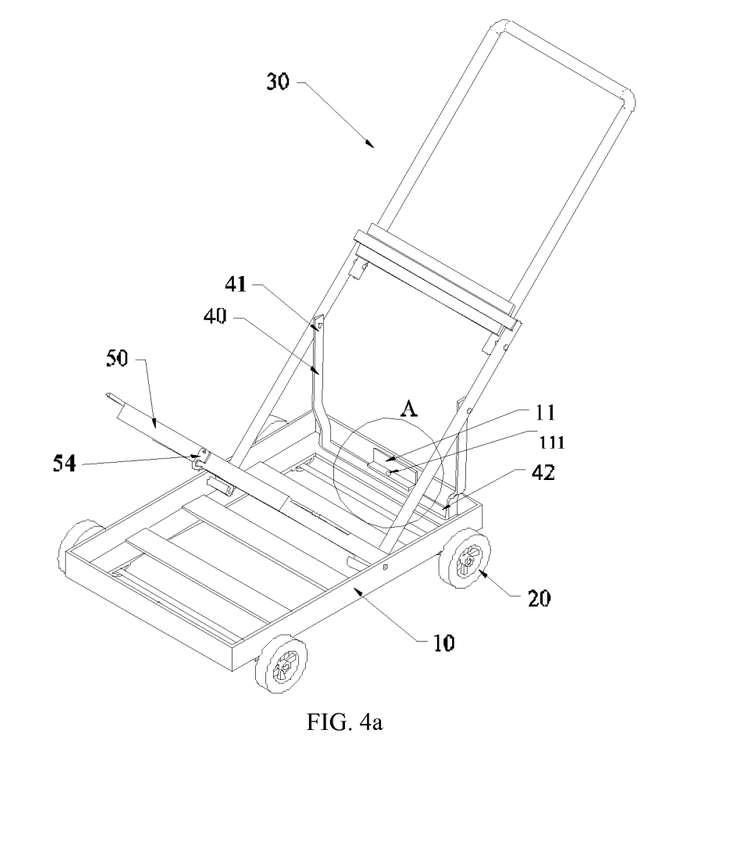
FIG. 4a is a perspective view of another working preferred embodiment of the casual handcart referred to in FIG. 4.
Figure 4B:
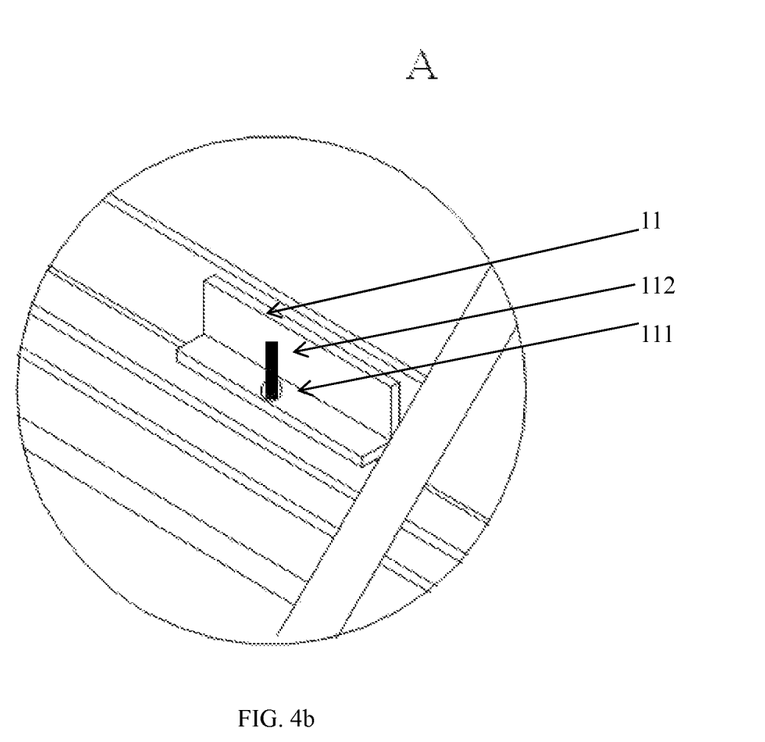
Figure 5:
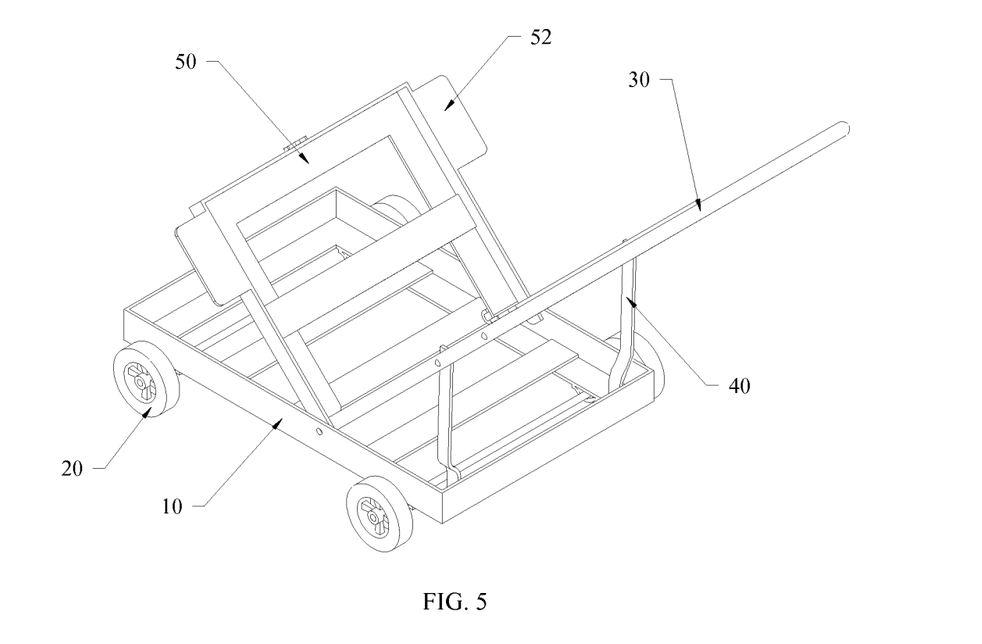
FIG. 5 is an enlarged view of the working preferred embodiment of the casual handcart described in this present invention.

What FIGS. 4a, 4b show is a preferred embodiment basing on the casual handcart showed in FIG. 4. About this preferred embodiment, the bottom of the horizontal positioning device 11 is mounted with through-hole 111, plug-pin 112 is mounted through the through-hole, then the second end 42 is obstructed in horizontal positioning device 11 (when the width of the second end 42 of the support device 40 is far more bigger than the bottom width of horizontal positioning device 11), then the stability of support device 40's supporting status will be improved. When the width of the second end 42 of the support device 40 is similar to the width of the horizontal positioning device 11, as a preferred manner, a through-hole can be mounted at the position which is corresponding to plug-pin 112 on the second end 42 of the support device 40 (not shown in the FIG.), then plug-pin 112 can go through the second end 42 and the bottom of the horizontal positioning device 11, the two are fixed together, and the stability of the support device 40's supporting status will be greatly improved.

According to the need, the first end of support device 40 can also be located on handle 30, and the second end mounted on bottom frame 10 (this implementation manner is not shown in the FIG.). To be specific, support device 40 can also be mounted as a side open half-frame shape, and the side opposite to the open side is the second end of support device 40, and the second end is rotatably connected with bottom frame 10; and on the side rod of the support device 40, the end which is far from the second end is the first end of support device 40, the first end is mounted with chute which slides along the draw rod or handle 30, the chute matches the shape of the draw rod or handle 30, and a location block is mounted at a certain position on the draw rod or handle 30. When the casual handcart is carrying a heavy load, support device 40 can be rotated around the second end of support device 40, and the chute of the first end of support device 40 will be nested on handle 30 and then slide to the location block, then the first end of support device 40 is located on a certain position of handle 30 to stop the first end of support device 40 from sliding. And more location blocks can be mounted on handle 30 according to the need, so as to adjust the inclination direction of draw rod 30 to give the manual draw rod 30 an optimum inclination direction.

In actual uses, many goods are in rectangle shape, or can be packed to be transported by rectangle shaped boxes. When the handcart is moving on a ramp, the goods put on the bottom frame 10 will easily slide down. In the preferred embodiment of the handcart described in this present invention, rotary frame or bearing board 50 is rotatably mounted at the draw rod 30 bottom, and rotary frame or bearing board 50 can be located in the position which is vertical to draw rod or handle 30; when goods is put on rotary frame or bearing board 50, they will rotate together with the draw rod or handle 30 relative to bottom frame 10, and then they will not slide from bottom frame 10, when carrying light weight goods, the support device 40 do not have to be unfolded, and draw rod or handle 30 can rotate freely against bottom frame 10 to ensure stable transportation of the goods on bottom frame 10; when carrying heavy weight goods, draw rod or handle 30 can be adjusted to a suitable inclination direction, at this moment, rotary frame or bearing board 50 will rotate a certain angle up with handle 30, this makes the goods locate in the wedge shape formed by rotary frame or bearing board 50 and handle 30, then the goods will not slide down easily, then unfold support device 40, and use it to make the weight shared by bottom frame 10.

Figure 6:
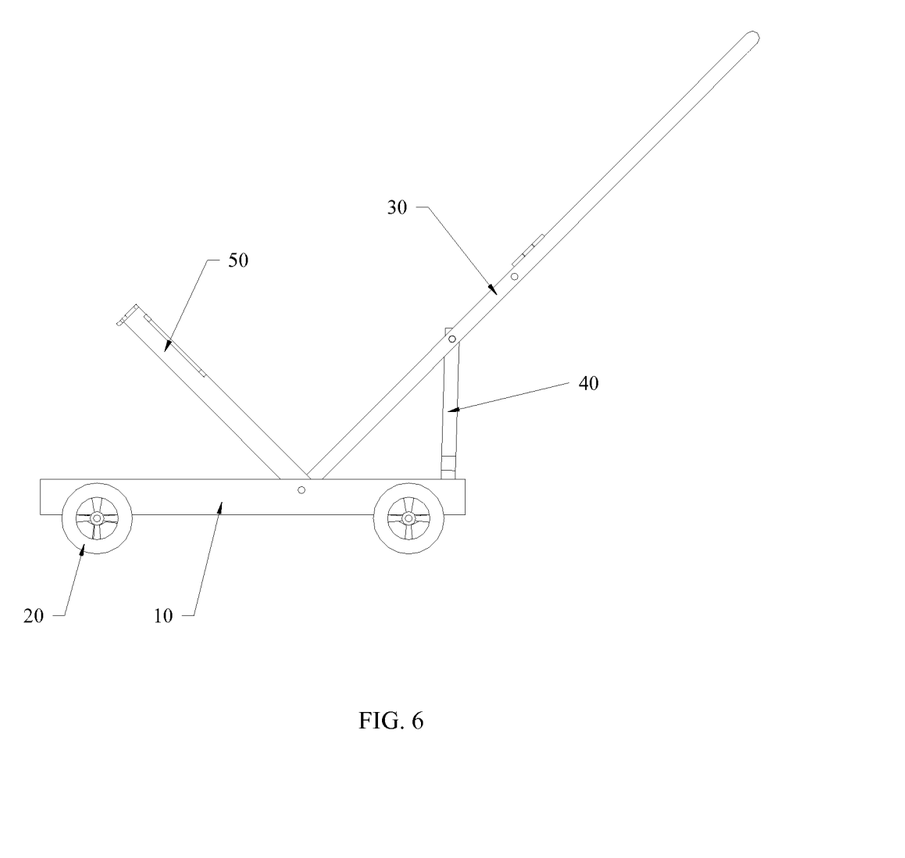
FIG. 6 is a direct view of the working preferred embodiment of the casual handcart described in this present invention.
Figure 7:
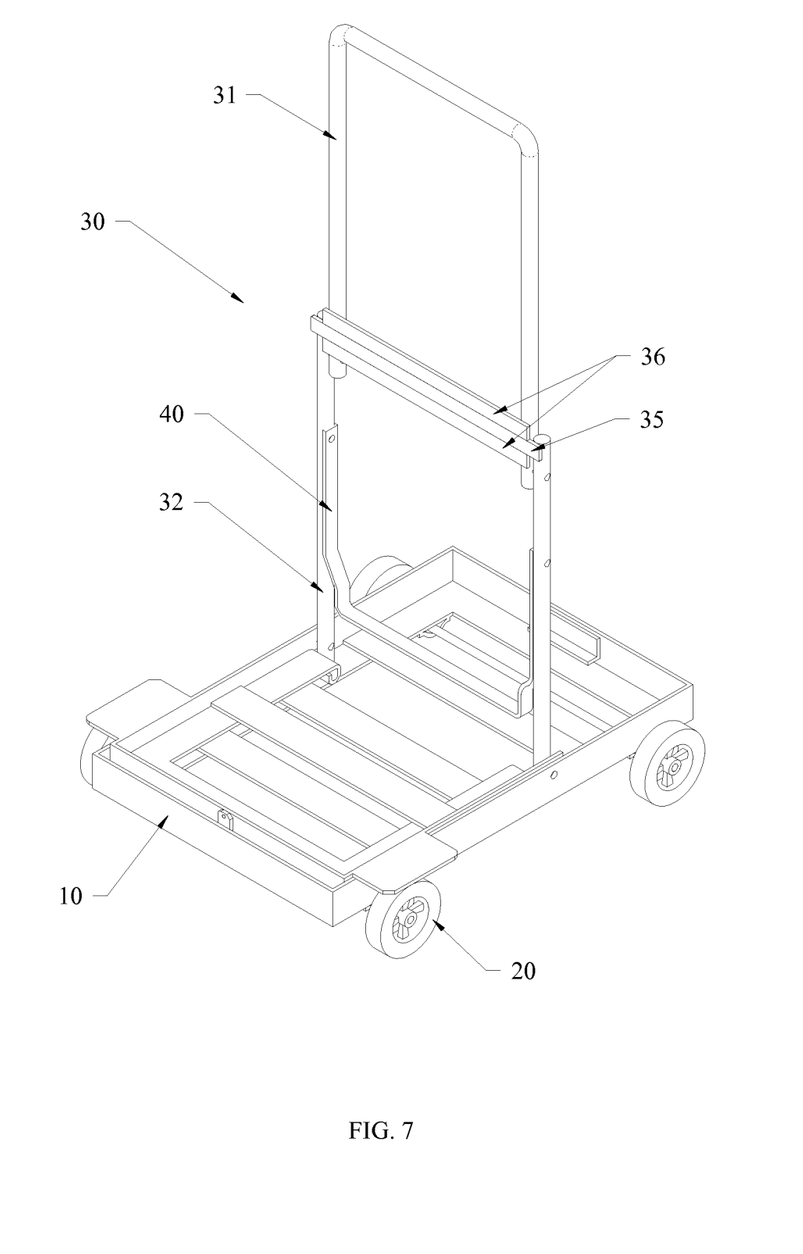
FIG. 7 is a perspective view of the preferred embodiment of the casual handcart described in this present invention in a parked position.
Figure 8:
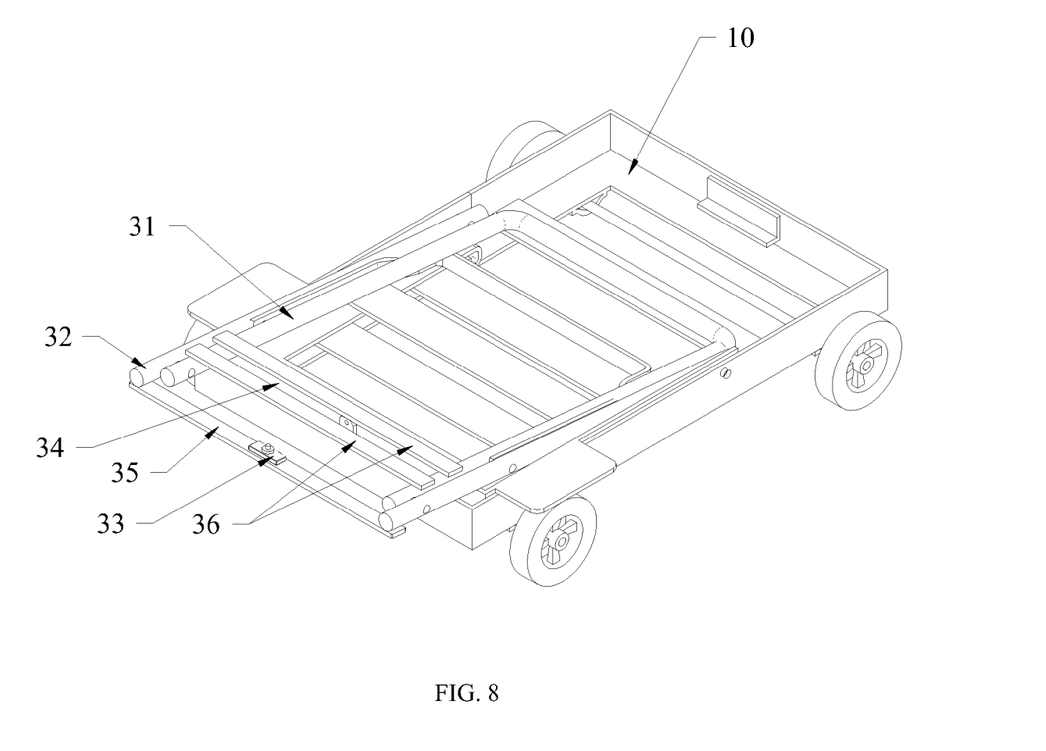
FIG. 8 is a perspective view of the preferred embodiment of the casual handcart described in this present invention in a folded position.
Figure 9:
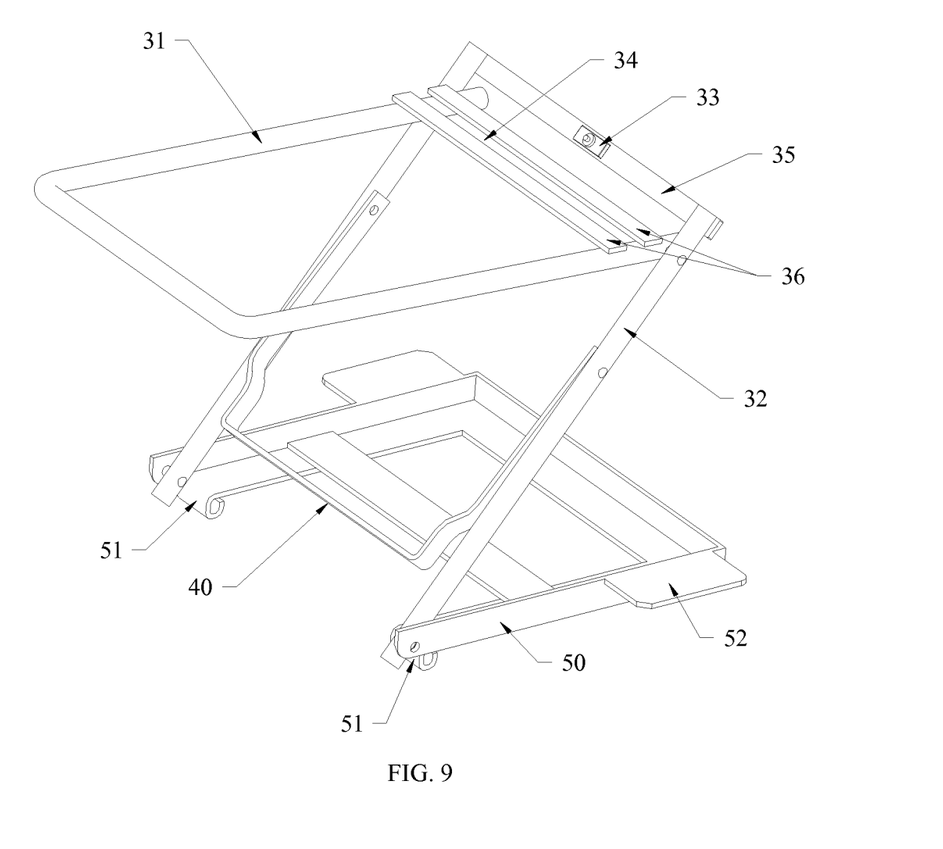
FIG. 9 is a perspective view of the preferred embodiment of the casual handcart described in this present invention of the handle bar being folded.
Figure 10:
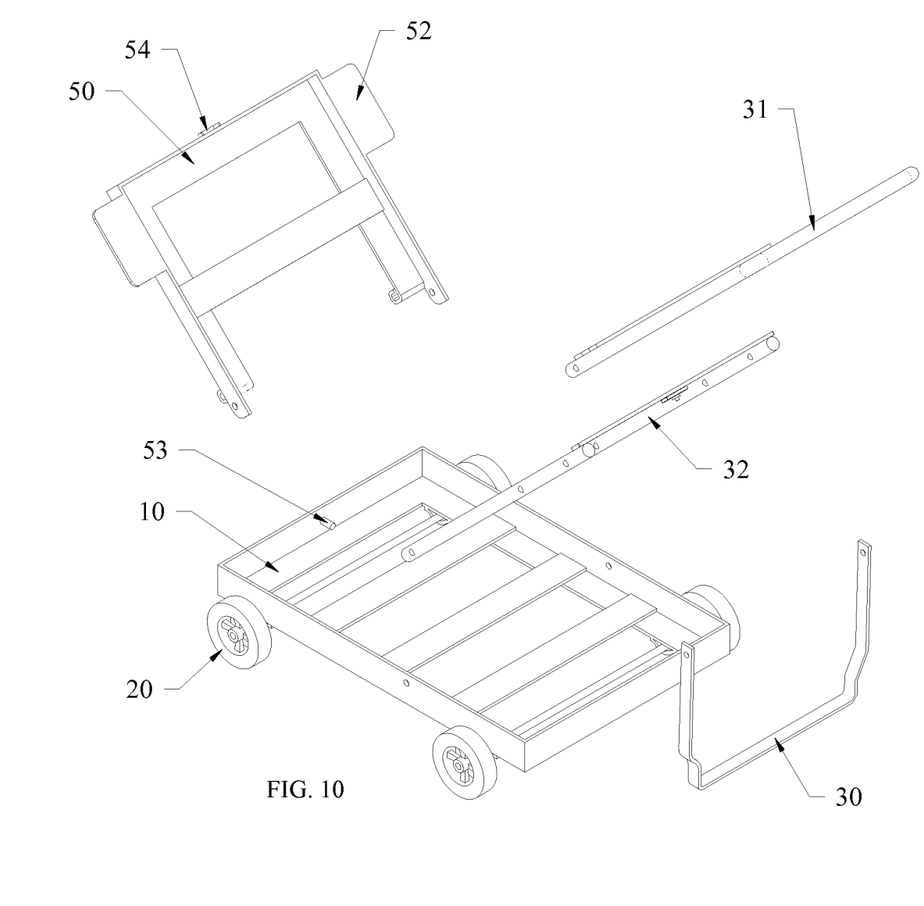
FIG. 10 is an exploded view of the preferred embodiment of the casual handcart described in this present invention.
Figure 11:
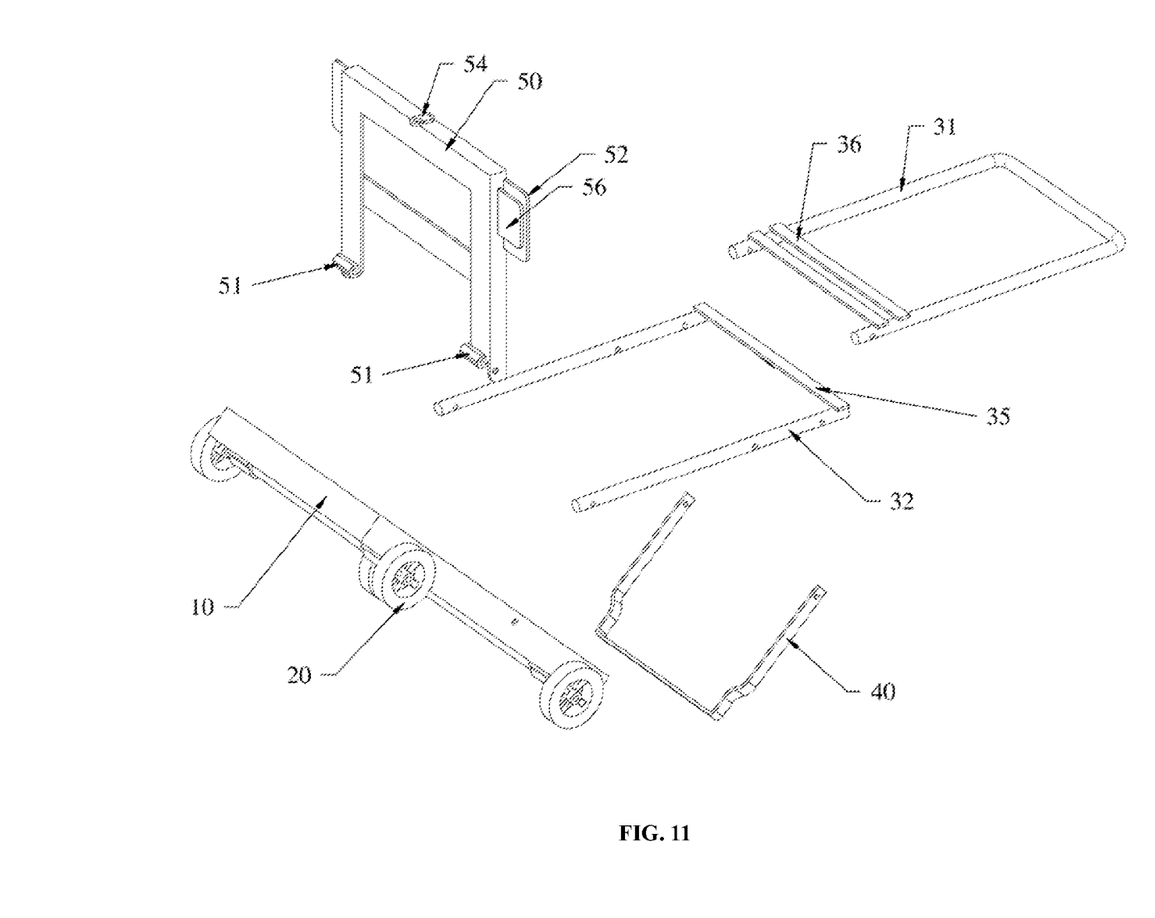
FIG. 11 is another exploded view of the preferred embodiment of the casual handcart described in this present invention.

As FIG. 6 shows, of this preferred embodiment, to locate rotary frame or bearing board 50 at the position which is vertical to handle 30, a vertical location device 51 is mounted on rotary frame or bearing board 50. Of this preferred embodiment, rotary frame 50 should better be welded by angle steel, the end of the side steel, which is rotatably connected with draw rod or handle 30, bends down to from vertical location device 51. When rotary frame or bearing frame 50 is rotated vertical to handle 30, the vertical location device stops the end of draw rod or handle 30 from continuing to turn, and fixes rotary frame or bearing frame 50 to the position vertical to handle 30.

To be convenient to carry large size goods, the rotary frame or bearing frame 50 of this preferred embodiment has an extending board, and this makes the area of rotary frame or bearing frame 50 bigger. To be specific, extending board 52 can also be mounted to rotate relative to rotary frame or bearing frame 50, it can be unfolded when necessary and can be folded when not needed, and this will reduce the storage space. Braking system is mounted under extending board 52, and it is formed from plastic pieces 56.

For the effect that rotary frame can be located on bottom frame when parking the handcart, of this preferred embodiment, block pillar 53 and block hook 54, which cooperate with each other, are mounted between rotary frame and bottom frame. To be specific, a rotate-able block hook 54 is mounted at the position corresponding to rotary frame, when rotary frame and bottom frame coincide (see FIG. 4), block pillar 53 can snap into block hook 54 to restrict the relative motion between rotary frame and bottom frame. The above described braking system will start working when pillar 53 snaps into block hook 54, in another situation, when the braking system is pressured, the pressure will be delivered directly to the wheels by the plastic piece 56, and the wheels will stop turning.

Of this preferred embodiment, draw rod or handle 30 comprises an upper draw rod 31 and a lower draw rod 32 which are rotatably connected, and a location locking device is mounted at the connection position. In this way, draw rod 30 can be folded, and the storage space of the handcart is further reduced, when using the handcart, unfold upper draw rod 31 and lower draw rod 32 in the same plane, and fix the relative position of the two draw rods by the location locking device. The location locking device comprises lock plate 33 and lock slot 34, which are mounted between upper draw rod 31 and lower draw rod 32. To be specific, the first connection board 35 can be mounted at the upper end of lower draw rod 32, a rotatable lock plate 33 can be mounted at the first connection board 35; and two second connection boards 36 can be mounted at the lower end of upper draw rod 31, and the two second connection boards 36 form the locking slot 34 for lock plate 33 to pass through. When upper draw rod 31 turns to the plane which lower draw rod 32 locates, one side of the first connection board 35 will connect the second connection board 36 of upper draw rod 31 to restrict it from more moving; at the same time, lock plate 33 which passes through lock slot 34 rotates a certain angle to connect the other side of the first connection board 35 to restrict upper draw rod 31 from inversion rotation, then upper draw rod 31 and lower draw rod 32 will be fixed on the same plane, for storage once again, by turning lock plate 33 a certain angle and separate it from lock slot 34, restricting rotation between upper draw rod 31 and lower draw rod 32 can be achieved.

The above described mode only shows some of the implementation manners of this present invention, it describes in detail and specifically, but this cannot be understood as restrictions to the range of this present invention. It should be mentioned that, to ordinary skilled technicians in this area, some changes and improvement can be made on condition of not detracting from the concept of this present invention, and these are within the range of this present invention's protection. So the range of this present invention's protection should be subject to the requirement from the enclosed rights.

The invention claimed is:

1. A handcart for transporting an object comprising:
a bottom frame having a x and y dimension, a front, a rear, and a bottom;
at least three wheels mounted on said bottom of said bottom frame, with a first wheel mounted beyond said dimension of said bottom frame;
a handle pivotably connected to said bottom frame at a first location being slightly past the middle of the bottom frame towards the rear;
a bearing board pivotably connected to said handle and said bottom frame at said first location having a vertical location device, wherein said vertical location device allows a maximum ninety degree angle of pivotal movement between said bearing board and said handle where the object is adapted to be positioned therebetween;
a support device pivotably mounted on said handle for engagement of said bottom frame to distribute the weight of the object bearing on said handle to said bottom frame; and
a braking system comprises at least one extending board mounted on the bearing board extending beyond said dimension of said bottom frame for engagement of said first wheel to prevent movement of said wheel and said handcart.

2. The handcart according to claim 1 wherein said support device having a first end and a second end, said first end of the support device is rotatably mounted to the handle, and said second end of the support frame is positioned at the rear of the bottom frame.

3. The handcart according to claim 2 wherein said bottom frame comprises a horizontal positioning device, the second end of the support device is adapted to be snapped inside the horizontal positioning device to prevent the sliding motion of the second end of the support frame.

4. The handcart according to claim 3 wherein said horizontal positioning device having an aperture which is positioned at the bottom of the horizontal positioning device, further comprises a pin adapted for securing the second end of the support device inside the horizontal positioning device.

5. The handcart according to claim 2 wherein the support device supports said handle such that said handle forms a predetermined angle with respect to the bottom frame.

6. The handcart according to claim 1 wherein the support device supports said handle such that said handle forms a predetermined angle with respect to the bottom frame.

7. The handcart according to claim 1 wherein the weight of the object is adapted to be mainly supported at the first location, and then is delivered to the bottom frame; with the support device adapted to only supporting a small part of the object's weight.

8. The handcart according to claim 1 wherein the support device supports the handle to form a certain angle with the bottom frame to achieve the most energy-saving effect while pulling or pushing the handcart.

9. The handcart according to claim 1 wherein said handle comprises an upper portion and a lower portion, said upper portion is rotatably connected to the lower portion of the handle, further comprising a locking mechanism at the connection point of the upper portion of the handle and the lower portion of the handle.

10. The handcart according to claim 9 wherein the locking mechanism comprises a lock plate and a lock slot which is mounted between the upper portion of the handle and the lower portion of the handle.

11. The handcart according to claim 1 wherein the support device supports said handle such that said handle forms a predetermined angle with respect to the bottom frame.

* * * * *